United States Patent
Lehr et al.

(10) Patent No.: US 9,669,483 B2
(45) Date of Patent: Jun. 6, 2017

(54) ENHANCED ARC CONTROL FOR MAGNETICALLY IMPELLED BUTT WELDING

(71) Applicant: Baker Hughes Incorporated, Houston, TX (US)

(72) Inventors: Joerg Lehr, Celle (DE); Dominik Brouwer, Hannover (DE)

(73) Assignee: Baker Hughes Incorporated, Houston, TX (US)

( * ) Notice: Subject to any disclaimer, the term of this patent is extended or adjusted under 35 U.S.C. 154(b) by 466 days.

(21) Appl. No.: 14/157,275

(22) Filed: Jan. 16, 2014

(65) Prior Publication Data
US 2015/0196968 A1    Jul. 16, 2015

(51) Int. Cl.
B23K 9/08    (2006.01)
B23K 9/028    (2006.01)

(52) U.S. Cl.
CPC .............. *B23K 9/08* (2013.01); *B23K 9/0282* (2013.01)

(58) Field of Classification Search
CPC ................................. B23K 9/08; B23K 9/0282
USPC ...................... 219/123, 100, 121.11, 61, 61.3
See application file for complete search history.

(56) References Cited

U.S. PATENT DOCUMENTS

| | | | | |
|---|---|---|---|---|
| 3,192,355 A | * | 6/1965 | Foster | B23K 11/04 219/104 |
| 3,484,578 A | * | 12/1969 | Sciaky | B23K 9/08 219/123 |
| 3,937,916 A | * | 2/1976 | Sciaky | B23K 9/08 219/101 |
| 4,052,585 A | * | 10/1977 | Sidyakin | B23K 9/08 219/100 |
| 4,273,986 A | * | 6/1981 | Edson | B23K 9/08 219/100 |
| 4,278,868 A | * | 7/1981 | Rudd | B23K 9/08 219/100 |
| 4,443,686 A | * | 4/1984 | Pache | B23K 9/08 219/101 |
| 4,511,784 A | * | 4/1985 | Miyamori | B23K 9/08 219/100 |

(Continued)

OTHER PUBLICATIONS

Sato, T, et al., "An experimental study of rotational behaviour of the arc during magnetically impelled arc butt welding," Welding International, Jan. 2010, 7pps.

*Primary Examiner* — David Angwin
*Assistant Examiner* — Lawrence Samuels
(74) *Attorney, Agent, or Firm* — Steve Rosenblatt

(57) ABSTRACT

Tubulars are joined for subterranean borehole use in the production of hydrocarbons by a technique of magnetically impelled arc butt (MIAB) welding. Large casing can be accommodated and the weld quality is maintained with control over the pattern of arc movement on the end walls by virtue of relative movements of the tubulars as the arc is generated and the magnetic field is applied. One or both tubulars can be manipulated relatively in a variety of direction to control the movements of the arc as the magnetic field induces circular arc movement along the end walls of the tubulars to heat up the ends to the temperature needed to effectively fuse the wall ends together. Movement can be rotational or axial about a fixed axis or lateral with respect to the axes both with and without skewing of the axes. The movements can be combined to obtain the desired track.

23 Claims, 4 Drawing Sheets

(56) References Cited

U.S. PATENT DOCUMENTS

| | | |
|---|---|---|
| 5,117,084 A | 5/1992 | Kuchuk-Yatsenko et al. |
| 6,211,489 B1 | 4/2001 | Kuchuk-Yatsenko et al. |
| 2004/0118826 A1 | 6/2004 | Schmitt |
| 2013/0092665 A1 | 4/2013 | Hassel et al. |
| 2013/0092670 A1 | 4/2013 | Hassel et al. |
| 2013/0145590 A1 | 6/2013 | Brouwer et al. |

* cited by examiner

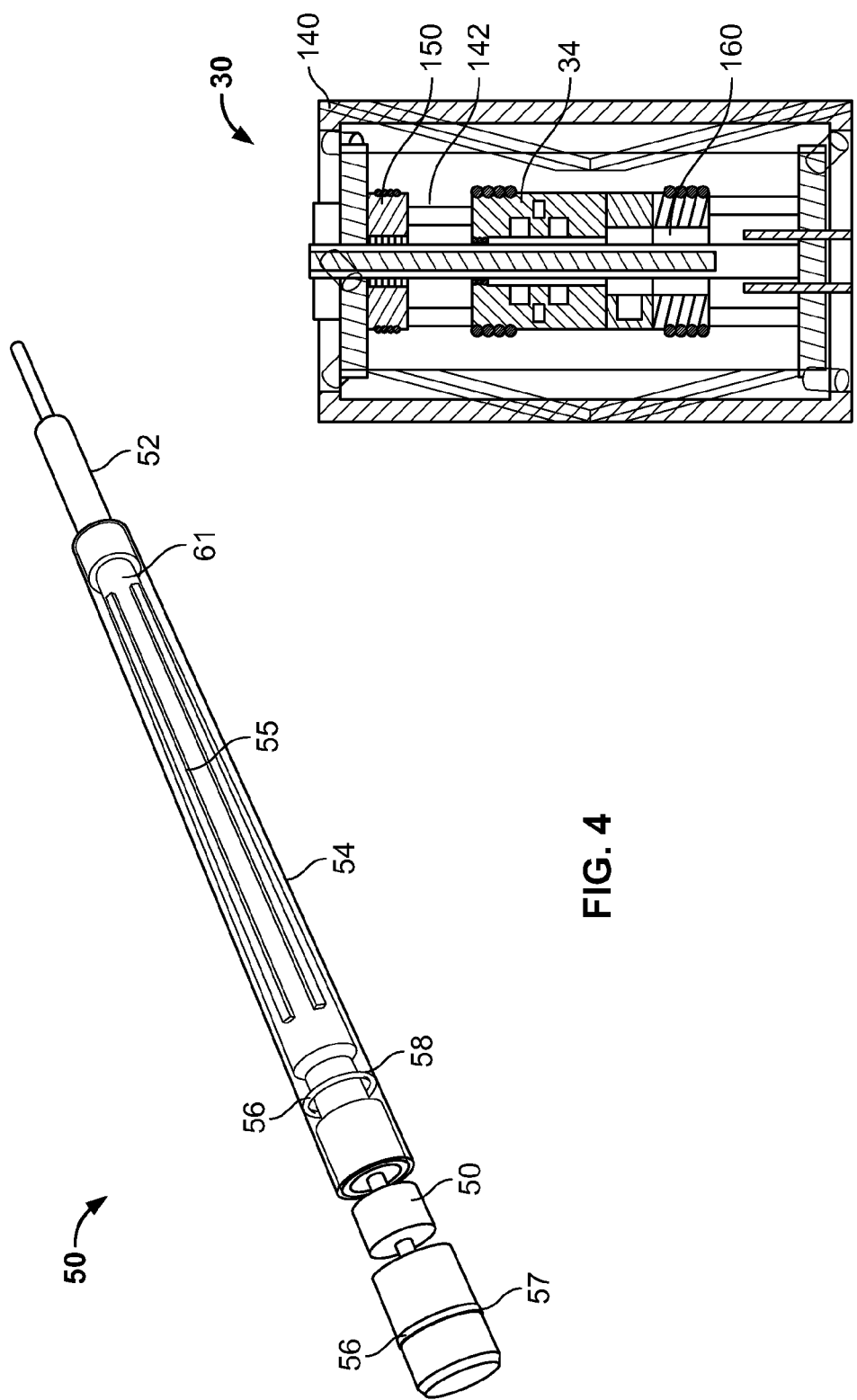

ENHANCED ARC CONTROL FOR MAGNETICALLY IMPELLED BUTT WELDING

FIELD OF THE INVENTION

The field of the invention is a joining method for oilfield tubulars to produce strings to extend to a subterranean location and more particularly control of arc placement with manipulation of the position and/or speed of at least one of the tubulars to be joined.

BACKGROUND OF THE INVENTION

Devices for pipe end alignment for joining together have been described in US2013/0145590. The focus of the device is to get axial alignment to facilitate threading or welding tubulars together for the purpose of extending a string to a subterranean location.

The application of magnetically impelled arc butt (MIAB) welding in forming strings to extend to a subterranean location is generally described in US2013/0092670. What is not addressed in this reference is the control of arc position particularly in thick walled tubulars. The tendency of the arc to wander between the inner and the outer wall of the tubulars to be joined was the subject of an analysis in T Sato, J Katayama, S Ioka & M Otani (1991); An Experimental Study of Rotational Behaviour of the Arc During Magnetically Impelled Arc Butt Welding; Welding International, 5:1, 5-10, DOI: 10.1080/09507119109447814. The article can also be found at: http://dx.doi.org/10.1080/09507119109447814. The article discusses the tendency of the arc to wander from an inside wall on initial heating to the outside wall as the heat builds and the arc circumferential speed picks up. The research examines the effects of arc strength and magnetic field strength on the migration of the arc as the heating process begins until the needed temperatures are achieved. With larger and thicker walled tubulars to be joined the issue of even heating becomes more important for achieving proper weld quality when the two tubular ends are pushed together to complete the joint. Too much localized heating can burn through small areas and preclude a quality joint. Some of these problems with arc management were discussed in the above article.

The present invention takes a different approach than the past MIAB welding research and techniques discussed above. The objective of arc management now centers on tubular position control as the prime controlled variable for desired arc tracking with respect to the wall of tubulars large and small and made of a variety of metals so as to optimize the weld quality when ends are joined together for completion of the welded connection. The arc location can be, for example, held at a steady location orbit approximately equidistant between the internal and external wall dimensions or alternatively, particularly for the larger diameters and thicker walled pipes the arc can follow an orbital and oscillating path with the goal of uniform heating of the entire wall end area where the two tubulars will make contact when pushed together. The control of the arc path is achieved by relative movement of the two tubular ends as the arc is induced to make circular or elliptical movement by the applied magnetic field. The movement can involve movement of one or both tubulars at the same time and all degrees of freedom for movement of the tubular ends is envisioned. For example, there can be relative rotational movement about a fixed longitudinal axis or relative axial movement about fixed and aligned longitudinal axes. The relative rotational movement of the tubulars rotating in tandem in opposite direction of the arc rotational direction compensates arc rotation speed limitation for tubulars with increased diameter and/or arc current direction dependent uneven heat up effects on tubular surface ends. Different turning directions and turning frequencies are used to heat up the ends of the tubulars differently or equally e.g. to connect tubular of different materials (e.g. different thermal conductivity, magnetic saturation, melting point) or wall thicknesses. Alternatively, there can be relative skewing between the longitudinal axes or relative lateral movement of the longitudinal axes without skewing them. The above mentioned movements and others can be combined. Cameras or other sensors can be used to track the arc location and movements to tie into the positioning system that will move one or both tubulars and keep or redirect the arc to the desired movement pattern with respect to the end wall areas of the opposed tubulars. Permanent magnets or solenoids further comprising an additional oscillating of the arc on its circular or elliptic path. Tubulars of any shape: round, elliptical or folded, might be connectable more precisely utilizing these technologies in combination. These and other aspects of the present invention will be more readily appreciated from a review of the description of the preferred embodiment and the associated drawings while recognizing that the full scope of the invention is to be found in the appended claims.

SUMMARY OF THE INVENTION

Tubulars are joined for subterranean borehole use in the production of hydrocarbons by a technique of magnetically impelled arc butt (MIAB) welding. Large casing can be accommodated and the weld quality is maintained with control over the pattern of arc movement on the end walls by virtue of relative movements of the tubulars as the arc is generated and the magnetic field is applied. One or both tubulars can be manipulated relatively in a variety of direction to control the movements of the arc as the magnetic field induces circular arc movement along the end walls of the tubulars to heat up the ends to the temperature needed to effectively fuse the wall ends together. Movement can be rotational or axial about a fixed axis or lateral with respect to the axes both with and without skewing of the axes. The movements can be combined to obtain the desired track.

BRIEF DESCRIPTION OF THE DRAWINGS

FIG. 4 illustrates a prior art feed device;

FIG. 5 illustrates another view of a prior art magnetically impelled arc welding system;

DETAILED DESCRIPTION OT THE PREFERRED EMBODIMENT

A prior art apparatus and method for making a welded connection between tubulars using a magnetically impelled arc butt (MIAB) welding device is shown in FIGS. 1-5. In one aspect, the MIAB welding device may be configured to heat facing ends of a pair of tubulars using a high frequency arc ignition device or a drawn arc and to compressively engage the facing ends using a force application device. The tubulars may be round or non-round, and may be adapted for any type of use (e.g., underground, above-ground, conveying fluids, enclosing cables or wires, etc.). In another aspect, the MIAB welding device may be configured to melt facing ends of a pair of wellbore tubulars and to use a force application device to compressively engage the facing ends to form a welded joint. The wellbore tubular may be rigid drill pipe, coiled tubing, casing, production tubing, or liners. Merely for brevity, these prior art embodiments will be discussed in the context of an oil rig.

Figure 1:
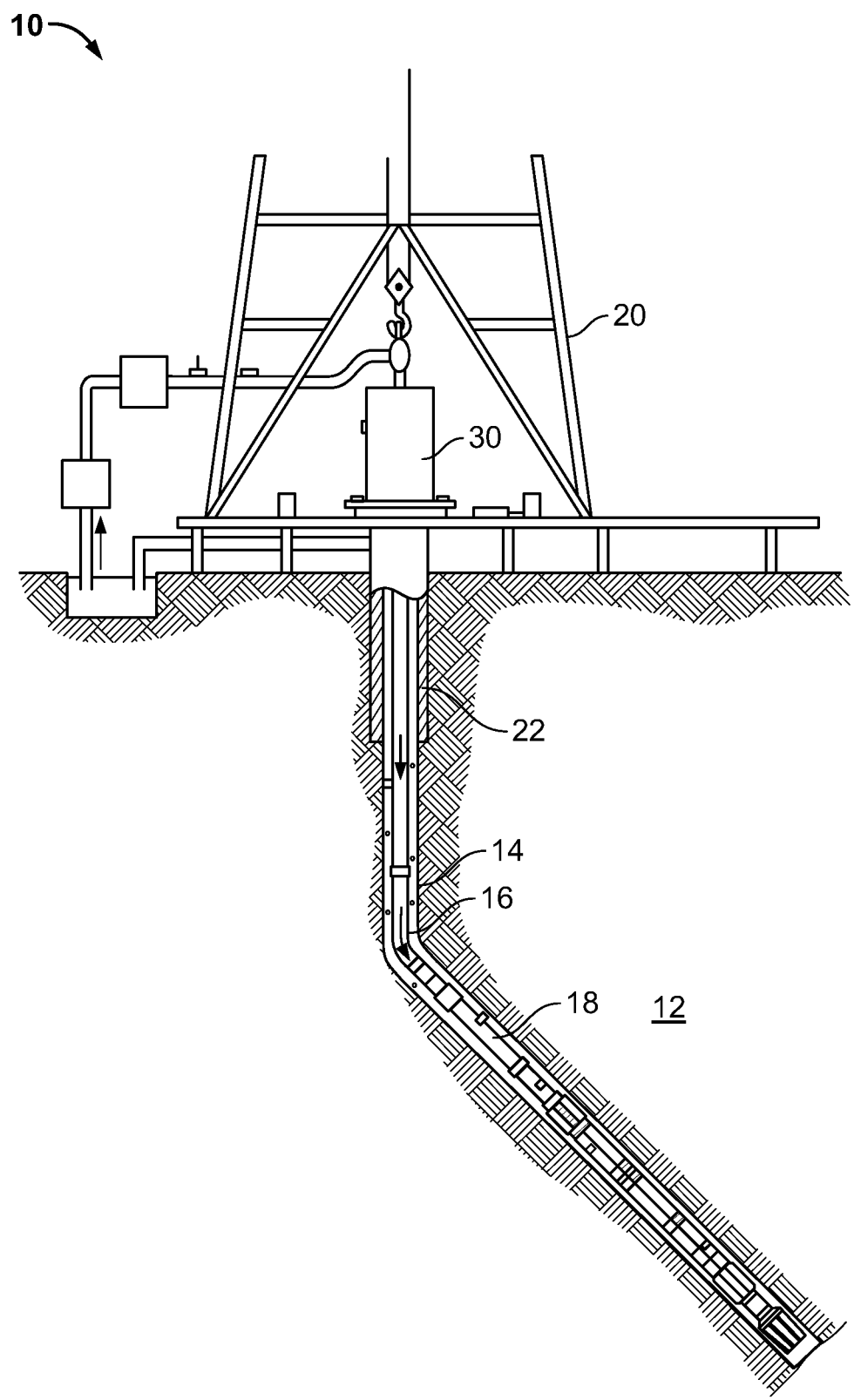
FIG. 1 illustrates a prior art rig having a welding system.

Referring now to FIG. 1, there is shown one illustrative embodiment of a platform 10 for drilling a wellbore 14 in an earth formation 12. While a land-based rig is shown, these concepts and the methods are equally applicable to offshore rigs. The platform 10 may include a drill string 16 that is suspended from a rig 20. The drill string 16, which may be formed of tubular joints or segments 18, may include power and/or data conductors such as wires for providing bidirectional communication and power transmission. The wellbore 14 may be lined with tubulars such as casing 22 or liners. The platform 10 may also be used to perform other well-related activities; e.g., completion activities such as lining and cementing a well and installing production tubing.

The drilling system 10 may include a magnetically impelled arc butt welding (MIAB) device 30 to form the drill string 16, or other wellbore structure, by welding successive joints of wellbore tubulars at the rig floor. Magnetically Impelled Arc Butt (MIAB) welding involves heating two components with an arc that is moved around the components' circumferences by a magnetic field. Once the ends of the components are sufficiently heated so as to plastically deform, the two ends are pressed together. The weld formed by this process is not a typical weld structure (e.g., a base material (BM) of a first pipe/a heat affected zone (HAZ) of a first pipe/a weld zone (WZ)/a heat affected zone of a second pipe/a base material of a second pipe). Rather, because of the press process, the weld zone (WZ) is pressed radially outwards and is not a part of the bond zone. Therefore, the resulting weld structure may be: a base metal (BM) of a first pipe/a heat affected zone (HAZ) of a first pipe/a heat affected zone (HAZ) of a second pipe/and a base metal (BM) of a second pipe. Filler material is not required in this process.

Figure 2:
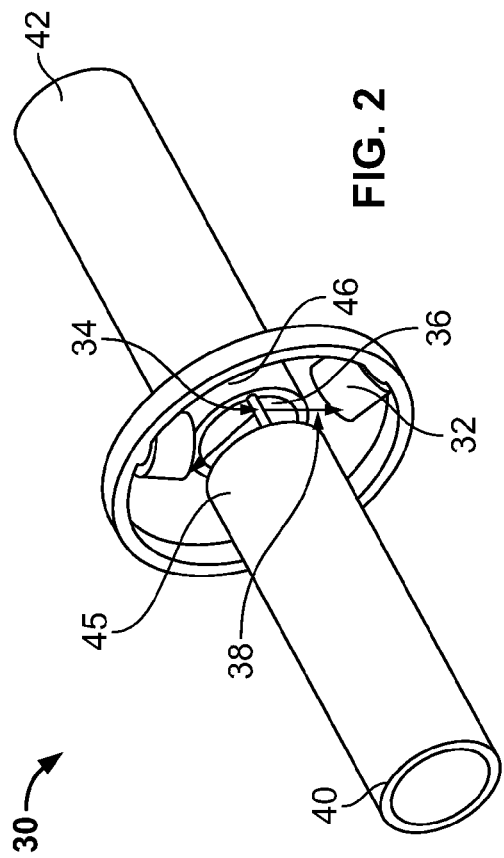
FIG. 2 schematically illustrates the operation of a prior art magnetically impelled arc welding system; in pre-connection process.

Referring now to FIG. 2, there are generally shown portions of an MIAB welding device 30 that control the arc during the welding heat up process. For clarity, the drawing should be viewed as the right side being the top and the left side being the bottom, although the disclosure allows for configurations having other relative alignments or orientations. The welding device 30 may include a magnetic field generator 32 arrayed around tubulars 40, 42 that have ends 45, 46, respectively. The magnetic field generator 32 is configured to cause an arc 34 in the gap 36 between the ends 45, 46 to rotate along a circumferential weld path. The magnetic field generator 32 generates a magnetic field that interacts with the arc 34 to generate an electromagnetic force 38 (or Lorentz force). The electromagnetic force 38 is influenced by the magnetic flux density in the gap 36, the arc current and the arc length (i.e., gap size). The magnetic field generator 32 may include a naturally magnetic material, an engineered magnetic material, a permanent magnet, an electromagnet, or a combination thereof. The term "magnet" is used herein to refer to any element, object, device that generates a magnetic field.

In embodiments, the welding device 30 may be configured to use high frequency (HF) ignition arc.

The welding device system 30 has one or more independent power source unit(s) that may be configured to generate the ignition arc. HF consists of high voltage sparks of several thousand volts which last for a few microseconds. The HF sparks will cause the tubular ends and gap to break down or ionize. Once an electron/ion cloud is formed, current can flow from the power source. In other embodiments, a drawn arc may be used.

Figure 3:
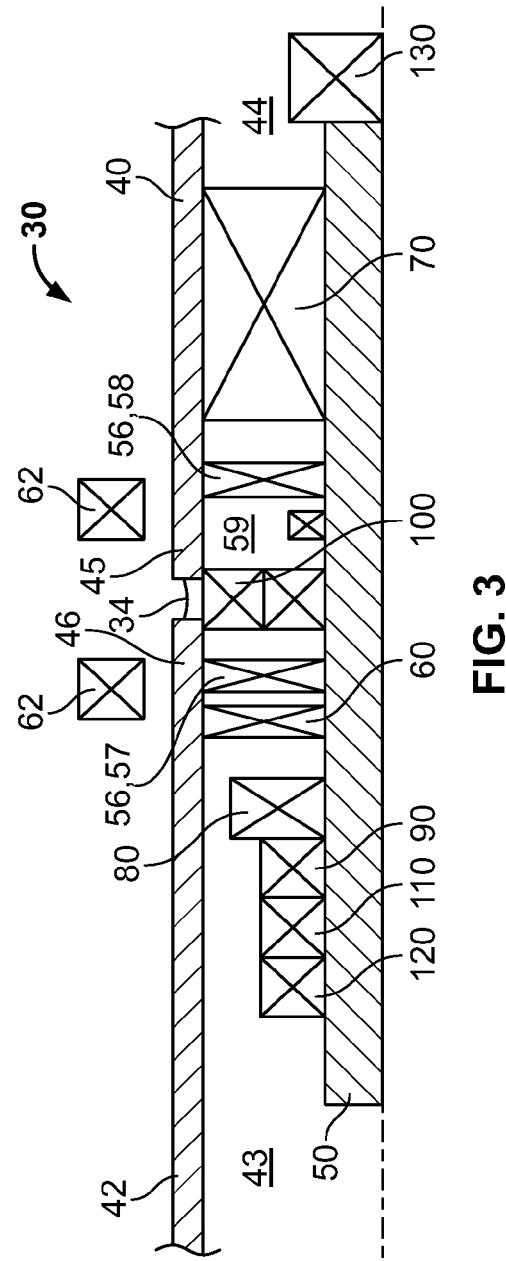
FIG. 3 illustrates a prior art magnetically impelled arc welding system; in post-connection process.

Referring now to FIG. 3, there is schematically shown one embodiment of a MIAB welding system 30 that may be used to join the wellbore tubulars 40, 42. The welding system 30 may include components, devices and systems that enable handling and positioning, or 'handling devices,' enable the welding process, or 'welding devices,' enable the pre-treatment or post-treatment of the tubulars, 'treatment devices,' and/or enable the analysis of the tubular, or 'analysis devices.' The components act either in sequence or cooperatively to feed and position the tubulars 40, 42 in the system 30, weld the tubulars 40, 42, and perform any necessary finishing operations for the welded tubulars 40, 42.

In one embodiment, the system 30 may include a feeding device 50, an arc guiding system 60, a gas insertion system 70, a machining system 80, a heating system 90, a forming device 100, an inspection system 110, a coating system 120, and an adaptive system 130. It should be understood that FIG. 3 depicts all of the described systems merely for ease of explanation. Other embodiments may omit some, if not most, of the described systems (e.g., welding re-forming, testing, etc.).

Referring now to FIGS. 3 and 4, there is shown one embodiment of a feeding device 50 that may be used to manipulate and secure wellbore tubulars 40, 42. The feeding device 50 may include a mandrel 52 that actuates a gripper 54 and a sealing assembly 56. The gripper 54 and the sealing assembly 56 may be positioned on a support shaft 61. The arc guiding system 60 may be nested within the sealing assembly 56.

Referring to FIG. 4, the gripper 54 may include one or more radially extendable pads 55 that extend outward to engage a surface of an inner bore of the upper tubular 40. The pads 55 may be actuated hydraulically, electrically, or by any other suitable method. The pads 55 may be configured as circumferentially arrayed fingers or slips, an annular inflatable packer, or any other arrangement adapted to engage and secure the upper tubular 40.

Referring now to FIGS. 3 and 4, the sealing assembly 56 may include a lower bore seal 57 and an upper bore seal 58. The lower bore seal 57 engages and seals off the bore 43 of the lower tubular 42. The upper bore seal 58 engages and seals of the bore 44 of the upper tubular 49. Thus, the seals 57, 58 cooperate to form an isolated zone 59 at the arc guiding system 60. That is, the isolated zone 59 is isolated from fluid flow up from the wellbore via the bore 43 or ambient fluids flowing down through the bore 44. In one embodiment, the seals 57, 58 may be inflatable seals that form a gas-tight seal.

Referring now to FIG. 3, the arc guiding system 60 guides the arc between the welding surfaces of the tubulars 40, 42 in a manner that allows a homogeneous heating and/or melting.

The arc guiding system 60 consists of magnetizable material, permanent magnets and/or electro magnets. The magnetic field lines generated from the arc guiding system 60 working in line or perpendicular to the field lines generated from the magnetic field generator 32 to guide or manipulate the rotating arc.

The arc guiding system 60 may include solenoids 62 to create electromagnets which can increase the force of the magnet fields. Thus, the welding arc 34 can rotate around the circumference of the tubulars 40, 42 at a higher rate, thus decreasing welding time for large diameter tubulars. The arc guiding system 60 may also include circuitry to oscillate the arc 34 radially using a superimposed magnetic field during revolution and to change the radial position of the arc 34 between revolutions. The arc guiding system 60 may also be configured to adjust the magnetic field orientation to cause the desired arc position and/or movement.

The gas insertion system 70 may be used to flow an inert gas into the isolated area 59 to reduce the likelihood of explosive gases from being present during the welding process and to prevent oxidation of surfaces during welding. The gas insertion system 70 may flow a shielding gas into the isolated zone 59 to reduce or eliminate hazardous materials (e.g., combustible gases) in the vicinity of the tubular ends 45, 46 that are being welded. Suitable shielding gas may include helium, argon, an engineered combination of gases, or any other inert or semi-inert gas that will protect the welding area from the surrounding environment. The shielding gas may be pumped by a suitable line (not shown), via the bore of the tubulars 40, 42, and/or from a location external to the tubulars 40, 42.

The machining system 80 may prepare the weld surfaces, rework the isolated area and/or the weld seam area 59 after welding, collect cuttings and other debris generated by the machining system 80, and structure or form the inner surfaces of the tubulars 40, 42. The machining system 80 may use known features such as cutters and abrasive surfaces to re-form the weld. Additionally, devices such as electromagnet catchers and aspirators may be used to capture and collect the debris and cuttings.

The heating system 90 may be used to heat treat the welded tubulars (e.g., at the weld seam), if needed, to obtain one or more desired material properties. The heating system 90 may use known heating devices (e.g., induction techniques) to increase or decrease strength or hardness, remove residual stresses, refine grain size or change the electromagnetic properties. The forming device 100 may include a ceramic protective covering device that provides a constant diameter of the tubular, or drift diameter, during the welding process. The forming device 100 many include one or more surfaces that shape a weld during the welding and/or heat treatment process.

The inspection system 110 may be used to perform one or more inspections of the weld and the tubulars 40, 42. For example, the inspection system 110 may test the material property or properties of the weld and the area around the weld. Also, the inspection system 110 may perform geometrical measurements of the weld and surrounding area. For example, the inspection system 110 may measure drift diameter, weld size, the presence of discontinuities, etc. The inspection system 110 may use known inspection techniques such as optical, ultrasonic, calipers, x-ray etc.

The coating system 120 may apply or regenerate one or more coatings in the weld seam area and/or the inner surfaces defining the bores 44, 43 of the wellbore tubulars 40, 42. The coating system 120 may include spray nozzles or foil application devices.

The adaptive system 130 may be a connector that is configured to connect with common drilling rig lifting and handing equipment or automated lifting and docking stations (ALDS). The adaptive system 130 may be shaped to receive a crane hook, hydraulic connectors, pneumatic connectors, electric connectors or other similar devices that allow the ALDS or personnel to secure and move the feed device 50. The adaptive system 130 may include suitable connections (not shown) for receiving pressurized air and power. The welding system 30 may include an arc electrical power supply for generating an arc and process control circuitry for controlling the welding process. These components are known in the art and will not be discussed in further detail.

Referring now to FIG. 5, there is shown the welding system 30 positioned in a housing or frame 140 that is constructed for use on a drill rig 20 (FIG. 1). The frame 140 may be portable and configured for installation and removal from a drill rig. The welding system 30 may include a feed device 50 as described previously that can manipulate and secure the tubular components in place within a process chamber 142 during the welding process. The welding may be performed by the arc guiding system 60 and other devices previously described. Additionally, the welding system 30 includes a force applicator 150 that can drive the upper tubular 40 (FIG. 3) against the lower tubular 42 (FIG. 13). The lower tubular 42 may be held stationary relative to the frame 140 with a suitable clamping device 160. The device used to apply the axial force can be either automatic or manual and may include pneumatic, electrical, and/or hydraulic devices.

Referring now to FIGS. 1-5, in one mode of operation, the adaptive system 130 may be used to connect the feed device 50 to any available rig moving and handling equipment. Then, the feed device 50 may be inserted into the upper tubular 40 and the gripping system 54 may be activated to engage and capture the upper tubular 40. Next, the upper tubular 40 is fed into and positioned within the process chamber 142 of the welding system 30. The tubular ends 45, 46 may initially be positioned in contact with one another or separated by a gap of a few millimeters. Also, the sealing assembly 56 may be activated to seal off the bores 44, 45 and form the isolated zone 59.

Welding begins by flowing an inert gas into the isolated zone 59 and by activating a power source to flow electricity through the ends 45, 46. The ends 45, 46 may be separated, if in contact, to generate a high frequency arc, such as arc 34, in the gap between the tubular ends 45, 46. The welding arc 34 heats the edges of the ends 45, 46. Simultaneously, the arc 34 rotates around the circumference of the tubulars 40, 42 due to the electro-magnetic force created between the magnet(s) 32 and the arc 34. In some embodiments, the surfaces of the ends 45, 46 are heated, but the surfaces of the tubular do not melt. In other embodiments, the surfaces of the ends 45, 46 are heated until the surface melt. This may be different from conventional forging methods wherein the material does not melt during the welding process. Also, during the welding process, the arc 34 may oscillate radially between the inner and outer diameters of the tubulars 40, 42. Once the ends 45, 46 of the tubulars 40, 42 are sufficiently heated so as to plastically deform, the force applicator 150 applies an axial force to the upper tubular 40 to compressively engage the heated end 44 with the heated end 46. During this process, the forming device 100 may maintain a constant diameter of the tubular.

After welding, the machining system 80, the heating system 90, the inspection system 110, and the coating system 120 may be activated as used as needed to form a welded joint having the desired geometrical and material properties. Of course, one or more of these systems may be used prior to welding as well.

As noted previously, rigid drill pipes are only one non-limiting type of wellbore tubular that may be welded. Other illustrative wellbore tubulars, include, but are not limited to, coiled tubing, and tubulars that are used to strengthen or isolate zones in a well (e.g., casing or liners). Still other tubulars that may be welded may be unrelated to the oil and gas production, e.g., underground or even above-ground pipes for conveying fluids (e.g., gas, water, oil, etc.) or for protecting wires, cables, and the like. The tubular components can also be contoured i.e. having a non-round shape (and not just oval).

The method of the present invention presents a deviation from the above described method. In the prior art method the desire is to get the tubulars clamped and in a fixed spatial relation to each other while moving the plane of the magnetic field or varying the arc energy input to control the spatial movements of the arc as the magnetic field induces the arc to move circumferentially along the opposing end wall of the clamped tubulars. In the present method the position of the arc 300 on the end walls 302 and 304 is accomplished by relative movement of one or both tubulars to be joined 306 and 308. Arrows 310 and 312 indicate that one or both tubulars 306 or 308 can be rotated about fixed axes 314 and 316 in either direction both one at a time or both together preferably when both are rotated together the movement is in the same direction rotationally. When the rotational movement is combined with movement in another plane the rotation can also be in tandem at the same or at different speeds. Arrows 318 and 320 represent axial movement along axes 314 and 316 when those axes are either fixed or moved in a lateral perpendicular plane or one or more skewed planes to a normally vertical plane in which axes 314 and 316 reside. Thus, axes 314 or/and 316 can be skewed angularly from the position shown in FIG. 6 such that the gap between ends 302 and 304 either remains constant for 360 degrees or gets wider at one location than at another location.

Figure 6:
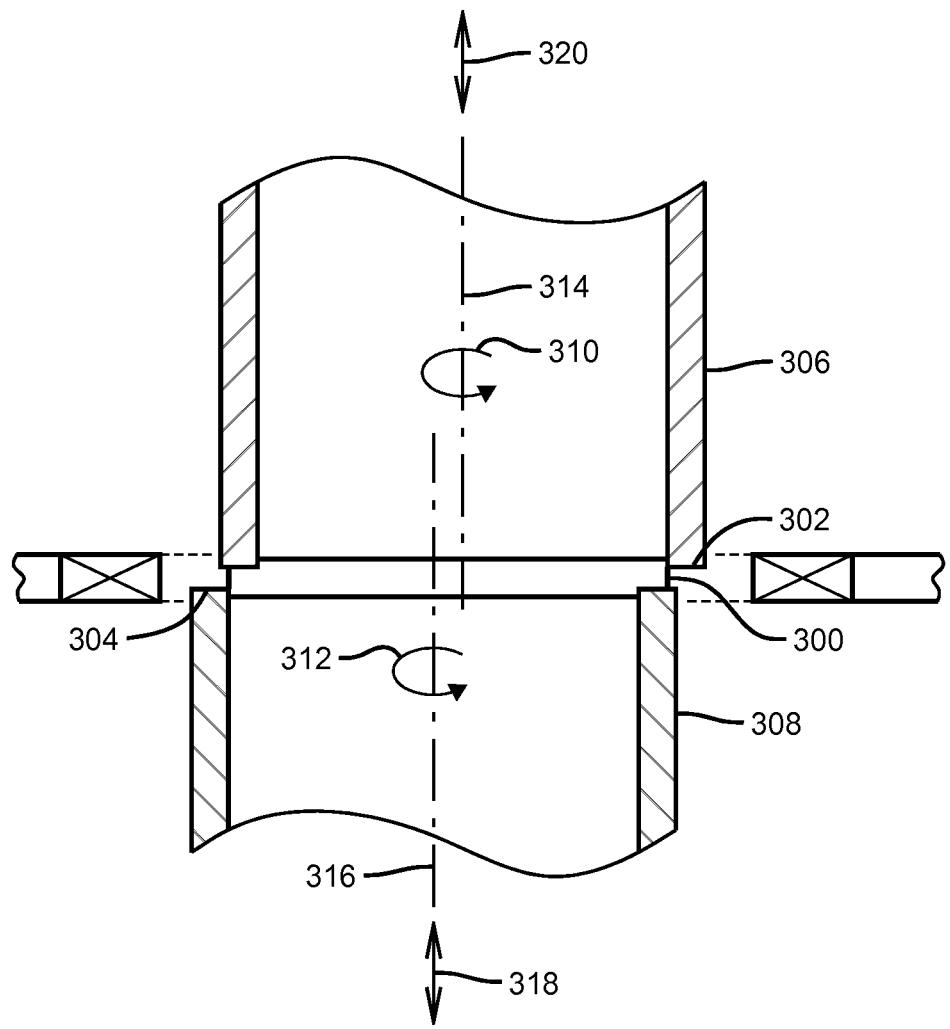
FIG. 6 schematically illustrates the options of tubular relative movements for control of the trajectory of the arc for the present invention.

What is then schematically represented in FIG. 6 is a multiple degree of freedom grip system for juxtaposed pipe ends where movement of a single tubular or both at once can be undertaken. The movements of one or both tubulars will impact orbital path of the arc with the object being somewhat overlapping loops to obtain over time uniform coverage of the arc for the entire wall end area. For some applications for smaller tubes with thinner walls the objective can be to centralize the arc in the middle of the wall end area. The movement of one or both tubulars can be coordinated along with high speed opposing cameras to determine the arc position at circumferentially spaced locations. Other location measurement techniques can be used such as lasers. The positional measurements are then fed to a processor that coordinates the movements of one or both of the tubulars in any one of multiple degrees of freedom as well as controlling the speed of response or direction of response for each or both of the tubulars. The movement can be accomplished with hydraulic systems such as pistons for linear movements or motors for rotary motions. The controls can be automated for sequential joining of tubulars to form a continuous string. Weld finishing components can be incorporated to, for example, grind off excess metal on the exterior or to otherwise inspect the finished joints and compare it to predetermined parameters. Instead of hydraulic power electrical or pneumatic power can be employed and rotational movements can also be accomplished with stepper motors or other types of electrically powered actuators to limit movements to small increments. The tubulars can be moved at the same time or at different times. Movements can be in opposed directions in rotation about a fixed axis or translation about a fixed access. Movement can be lateral so that the axis of each tubular that moves remains parallel to the original position or the movement can be a skew where the axis of a particular tubular moves angularly with respect to a previous position so that the axis does not remain parallel to its previous position. Such movements can be combined at the same or at different times and the direction of movement for a tubular can reverse. Both tubulars can have any or all the above movements at the same or at different times and the movement direction for two moving tubulars can be generally in the same or in the opposite direction or directions.

The above description is illustrative of the preferred embodiment and many modifications may be made by those skilled in the art without departing from the invention whose scope is to be determined from the literal and equivalent scope of the claims below:

We claim:

1. An arc control method for magnetically impelled butt welding, comprising:
   bringing ends of tubulars to be welded adjacent each other for an initial positioning of major longitudinal axes to create a gap therebetween;
   producing a condition to create an arc that crosses said gap;
   applying a magnetic field to said gap;
   moving said arc around on said ends of said tubulars;
   angularly skewing said major longitudinal axis of at least one of said tubulars from said initial positioning to obtain a different relative positioning between said tubulars to control the path of said arc on said ends of said tubulars; and
   butt welding said tubulars.

2. The method of claim 1, comprising:
   moving both said tubulars at the same time.

3. The method of claim 1, comprising:
   controlling the arc path between an inside and outside wall of said ends of said tubulars.

4. The method of claim 1, comprising:
   guiding the arc path for evenly heating between an inside and outside wall of said ends of said tubulars.

5. The method of claim 1, comprising:
   guiding the arc path for maintaining said arc midway between an inside and outside wall of said ends.

6. The method of claim 1, comprising:
   moving at least one of said tubulars about a fixed axis.

7. The method of claim 1, comprising:
   moving at least one of said tubulars by moving an axis of at least one of said tubulars.

8. The method of claim 1, comprising:
   moving both said tubulars about fixed axes either at the same time or at different times.

9. The method of claim 1, comprising:
   moving both said tubulars by moving an axis of both of said tubulars at the same time or at different times.

10. The method of claim 1, comprising:
    rotating at least one tubular about a fixed axis thereof.

11. The method of claim 1, comprising:
    translating at least one tubular about a fixed axis thereof or by moving said axis from a first to a second position parallel to said first position.

12. The method of claim 7, comprising:
    moving said axis from a first to a second position that is parallel or skewed to said first position.

13. The method of claim 9, comprising:
moving at least one of said axes from a first position to a second position where said second position is parallel or skewed with respect to said first position.

14. The method of claim 8, comprising:
moving both tubulars in the same or opposite direction.

15. The method of claim 9, comprising:
moving the axis of each tubular from a first to a second position where, in said second position, the axis of each tubular is parallel or skewed to the said first respective axis position.

16. The method of claim 1, comprising:
performing at least two of rotating at least one tubular about a fixed axis thereof,
translating at least one tubular about a fixed axis thereof or by moving said axis from a first to a second position parallel to said first position and
skewing an axis of at least one of said tubulars with respect to the other of said tubulars, at the same time or at different times.

17. The method of claim 1, comprising:
performing at least two of rotating both tubulars about a fixed axis thereof,
translating both tubulars about a fixed axis thereof or by moving said axis of said tubulars from a first to a second position parallel to said first position and
skewing an axis of both said tubulars with respect to an original position of said axis, at the same time or at different times.

18. The method of claim 16, comprising:
moving at least one tubular opposite directions at different times.

19. The method of claim 17, comprising:
moving both said tubulars in the same or different directions at the same or at different times.

20. The method of claim 19, comprising:
rotating said tubulars in the same direction as each other and in an opposite direction from said movement of said arc.

21. The method of claim 1, comprising:
modifying said magnetic field to alter the path of said arc to track different end shapes of said tubulars from round.

22. The method of claim 1, comprising:
using different tubular turning directions or turning frequencies to heat up said ends of the tubulars differently or equally.

23. The method of claim 1, comprising:
providing said tubulars of different materials.

* * * * *